United States Patent
Paddock et al.

(10) Patent No.: US 11,561,018 B2
(45) Date of Patent: Jan. 24, 2023

(54) CENTRAL PLANT CONTROL SYSTEM WITH CONTROL REGION DETECTION BASED ON CONTROL ENVELOPE RAY-CASTING

(71) Applicant: Johnson Controls Tyco IP Holdings LLP, Milwaukee, WI (US)

(72) Inventors: Tyler K. Paddock, Greenfield, WI (US); Nathan T. Ostrye, Milwaukee, WI (US); Aron M. Seiler, Freeland, MD (US); Christopher R. Amundson, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 918 days.

(21) Appl. No.: 16/283,579

(22) Filed: Feb. 22, 2019

(65) Prior Publication Data

US 2020/0271339 A1    Aug. 27, 2020

(51) Int. Cl.
*F24F 11/30* (2018.01)
*G06F 3/0487* (2013.01)
*F24F 11/77* (2018.01)
*G05B 15/02* (2006.01)
*G06F 9/30* (2018.01)

(52) U.S. Cl.
CPC .............. *F24F 11/30* (2018.01); *F24F 11/77* (2018.01); *G05B 15/02* (2013.01); *G06F 3/0487* (2013.01); *G06F 9/3004* (2013.01)

(58) Field of Classification Search
CPC .. F24F 11/30; F24F 11/77; F24F 11/70; F24F 11/62; G05B 15/02; G06F 3/0487; G06F 9/3004; Y02B 30/70
See application file for complete search history.

(56) References Cited

U.S. PATENT DOCUMENTS

| | | | | |
|---|---|---|---|---|
| 2001/0039230 A1* | 11/2001 | Severinsky | ........... | B60W 20/30 180/65.23 |
| 2003/0043469 A1* | 3/2003 | Weckstrom | .......... | G02B 27/143 359/618 |
| 2003/0160863 A1* | 8/2003 | Kakou | ............. | G08B 13/19656 348/E7.086 |
| 2009/0055136 A1* | 2/2009 | Ilies | ........................ | G06V 10/44 703/1 |
| 2010/0313070 A1* | 12/2010 | Joshi | ..................... | G06F 11/008 714/E11.159 |

(Continued)

*Primary Examiner* — Tuan C Dao
(74) *Attorney, Agent, or Firm* — Foley & Lardner LLP

(57) ABSTRACT

Disclosed herein are related to a system, a method, and a non-transitory computer readable medium for controlling a central plant. In one aspect, the system obtains a control envelope for a device controlled by the controller. The control envelope comprises boundaries of a plurality of control regions in a multidimensional operating space for the device. Each control region is enclosed by a corresponding boundary. The system counts a number of times that a ray of the device crosses the boundary of a control region. The system determines whether an operating point of the device is within the control region based on the counted number. The system operates the device according to a predetermined control technique corresponding to the control region, in response to determining that the operating point of the device is within the control region.

20 Claims, 9 Drawing Sheets

(56) References Cited

U.S. PATENT DOCUMENTS

| | | | |
|---|---|---|---|
| 2011/0221694 A1* | 9/2011 | Karaoguz | G06F 3/041 |
| | | | 345/173 |
| 2012/0016640 A1* | 1/2012 | Murphy | G10K 15/02 |
| | | | 703/2 |
| 2013/0187924 A1* | 7/2013 | Ogata | G06T 11/206 |
| | | | 345/440 |
| 2014/0095123 A1* | 4/2014 | Patnaik | G01N 33/00 |
| | | | 703/2 |
| 2014/0119604 A1* | 5/2014 | Mai | G06T 7/11 |
| | | | 382/103 |

* cited by examiner

CENTRAL PLANT CONTROL SYSTEM WITH CONTROL REGION DETECTION BASED ON CONTROL ENVELOPE RAY-CASTING

BACKGROUND

The present disclosure relates generally to the operation of equipment in a building, building management system (BMS), heating, ventilation and air conditioning (HVAC) system, and/or a central plant. The present disclosure relates more particularly to a system and a method for controlling operation of equipment in a building, BMS, and/or HVAC system based on a control envelope ray-casting.

A HVAC system (also referred to as "a central plant" or "an energy plant" herein) may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. The central plant may further include a HVAC controller to control operation of the HVAC devices.

In some implementation, controlling HVAC devices includes determining whether different operating parameters of the HVAC devices satisfy corresponding thresholds, and operating the HVAC devices according to the determination. For example, a chiller operates according to operating parameters including an inlet temperature, an outlet temperature, an inlet pressure, an outlet pressure, etc. One implementation of operating the chiller includes comparing measurement values of the inlet temperature, the outlet temperature, the inlet pressure, and the outlet pressure against corresponding threshold values, and enabling or disabling the chiller according to the comparison. However, comparing the measurement values against all of the threshold values may be computationally exhaustive. Moreover, repeatedly enabling and disabling the HVAC devices may exhibit hysteretic behavior, thereby reducing operating efficiency of the HVAC devices.

SUMMARY

Various embodiments disclosed herein are related to a controller. The controller includes a processing circuit comprising a processor and memory storing instructions executed by the processor. In one embodiment, the processing circuit is configured to obtain a control envelope for a device controlled by the controller. The control envelope includes boundaries of a plurality of control regions in a multidimensional operating space for the device. Each control region is enclosed by a corresponding boundary. In one embodiment, the processing circuit is configured to count a number of times that a ray of the device crosses the boundary of a control region. In one embodiment, the processing circuit is configured to determine whether an operating point of the device is within the control region based on the counted number. In one embodiment, the processing circuit is configured to operate the device according to a predetermined control technique corresponding to the control region, in response to determining that the operating point of the device is within the control region.

In some embodiments, the processing circuit is further configured to determine that the operating point of the device is within the control region, in response to the counted number being an even number.

In some embodiments, the processing circuit is further configured to determine that the operating point is within another control region, in response to the counted number being an odd number.

In some embodiments, two or more control regions overlap with each other.

In some embodiments, the device is a compressor. A first control region of the plurality of control regions may be associated with a target operating state of the device. The device may operate at a speed within a predetermined range in the target operating state. A second control region of the plurality of control regions may be associated with a speed-up state of the device. The device may operate at a speed above the predetermined range in the speed-up state. A third control region of the plurality of control regions may be associated with a slow-down state of the device. The device may operate at a speed below the predetermined range in the slow-down state.

In some embodiments, the multidimensional operating space of the device includes a saturated discharge temperature and a saturated suction temperature of the device.

In some embodiments, the processing circuit is further configured to increase an alarm counter in response to determining that the operating point is within the control region associated with a shut-down state. The device may be disabled in the shut-down state for a shut-down time period.

In some embodiments, the processing circuit is further configured to lockout the device in response to the alarm counter exceeding a predetermined threshold, and generate a user interface allowing a user operating the controller to unlock the device, after locking out the device.

In some embodiments, the processing circuit is further configured to reset the alarm counter in response to the alarm counter not exceeding the predetermined threshold within a predetermined time period.

In some embodiments, the processing circuit is further configured to detect a change of the operating point of the device to a deadband region, and operate the device according to the predetermined control technique corresponding to the control region, until the operating point of the device changes to another control region.

Various embodiments disclosed herein are related to a method of operating a device. The method includes obtaining a control envelope for the device. The control envelope includes boundaries of a plurality of control regions in a multidimensional operating space for the device. Each control region is enclosed by a corresponding boundary. The method includes counting a number of times that a ray of the device crosses the boundary of a control region. The method includes determining whether an operating point of the device is within the control region based on the counted number. The method includes operating the device according to a predetermined control technique corresponding to the control region, in response to determining that the operating point of the device is within the control region.

In some embodiments, the method includes determining that the operating point of the device is within the control region, in response to the counted number being an even number.

In some embodiments, the method includes determining that the operating point is within another control region, in response to the counted number being an odd number.

In some embodiments, two or more control regions overlap with each other.

In some embodiments, the device is a compressor. A first control region of the plurality of control regions may be associated with a target operating state of the device. The device may operate at a speed within a predetermined range in the target operating state. A second control region of the plurality of control regions may be associated with a speed-up state of the device. The device may operate at a speed above the predetermined range in the speed-up state. A third control region of the plurality of control regions may be associated with a slow-down state of the device. The device may operate at a speed below the predetermined range in the slow-down state.

In some embodiments, the method includes increasing an alarm counter in response to determining that the operating point is within the control region associated with a shut-down state. The device may disable in the shut-down state for a shut-down time period.

In some embodiments, the method includes locking out the device in response to the alarm counter exceeding a predetermined threshold, and generating a user interface allowing a user operating the controller to unlock the device.

In some embodiments, the method includes resetting the alarm counter in response to the alarm counter not exceeding the predetermined threshold within a predetermined time period.

In some embodiments, the method includes detecting a change of the operating point of the device to a deadband region, and operating the device according to the predetermined control technique corresponding to the control region, until the operating point of the device changes to another control region.

Various embodiments disclosed herein are related to a controller for an energy plant. The controller includes a processing circuit comprising a processor and memory storing instructions executed by the processor. In one embodiment, the processing circuit is configured to obtain a control envelope for a heating, ventilation and air conditioning (HVAC) device controlled by the controller. The control envelope includes boundaries of a plurality of control regions in a multidimensional operating space for the HVAC device. Each control region is enclosed by a corresponding boundary. In one embodiment, the processing circuit is configured to count a number of times that a ray of the HVAC device crosses the boundary of a control region. In one embodiment, the processing circuit is configured to determine whether an operating point of the HVAC device is within the control region based on the counted number. In one embodiment, the processing circuit is configured to operate the HVAC device according to a predetermined control technique corresponding to the control region, in response to determining that the operating point of the HVAC device is within the control region.

DETAILED DESCRIPTION

Overview

Figure 1:
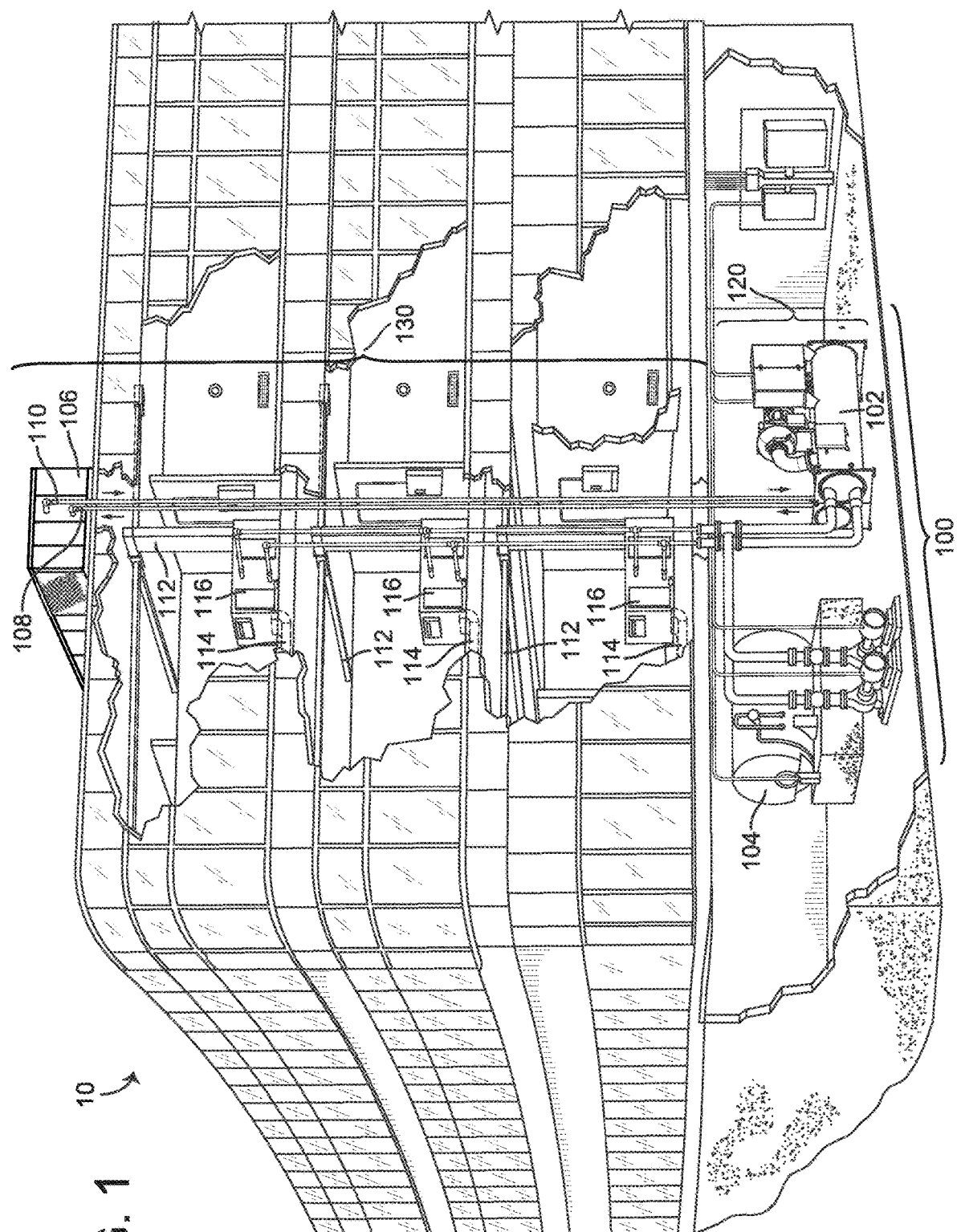
FIG. 1 is a drawing of a building equipped with an HVAC system, according to some embodiments.

Referring generally to the FIGURES, disclosed herein are systems and associated methods for controlling equipment in a building, building management system (BMS), HVAC system, and/or a central plant. As used herein, the term "building equipment" refers to any or all of these types of equipment.

Disclosed herein are related to a system, a method, and a non-transitory computer readable medium for controlling a central plant based on a control envelope. A control envelope includes boundaries of a plurality of available control regions in a multi-dimensional space defining one or more operating states of a component (e.g., HVAC device) of the central plant. In one aspect, an operating state of the component is indicated by a control region, in which an operating point is located. An operating point of a component is a set of values (e.g., inlet temperature, an outlet temperature, an inlet pressure, outlet pressure, etc.) indicating operating conditions of the component. In one example, an operating point located in a target control region corresponds to a target operating state, in which the component operates within a predetermined range (speed or power). For another example, an operating point in a first control region adjacent to a first edge of the target control region corresponds to a first operating state, in which the component is configured to operate at a higher capacity (e.g., higher speed) than in the target operating state such that the operating point can transition to the target control region. Similarly, an operating point in a second control region adjacent to a second edge of the target control region corresponds to a second operating state, in which the component is configured to operate at a lower capacity (e.g., lower speed) than in the target operating state such that the operating point can transition to the target control region.

In some embodiments, the system determines a control region, in which an operating point is located, based on ray casting algorithm. In one approach, the system counts a number of a ray of a component crossing a boundary of a control region, and determines a control region, in which the operating point is located based on the counted number. A ray of a component is a trajectory of a changing operating point of the component. For example, if a ray starting from inside a control region crosses or traverses the boundary of the control region an even number of times, then the system determines that the operating point is still located inside the control region. For another example, if the ray starting from inside the control region crosses or traverses the boundary of the control region an odd number of times, then the system determines that the operating point is located outside the control region. For another example, if the ray starting from outside a control region crosses or traverses the boundary of the control region an even number of times, then the system determines that the operating point is located outside the control region. For another example, if the ray starting from outside the control region crosses or traverses the boundary of the control region an odd number of times, then the system determines that the operating point is located inside the control region.

Advantageously, the disclosed system enables an operating state of the component to be determined in a computationally efficient manner. For example, tracking measurement values of multiple operating parameters of a component, and comparing each of the measurement values against a respective threshold value can be computationally exhaustive. Instead, the disclosed system represents the values of the operating parameters in a vector format, such that the measurement values in the vector format correspond to a location in a multidimensional space (e.g., each element of the vector indicates a value of one of the dimensions). Determining a location in a multi-dimensional space may be computationally exhaustive. By implementing ray-casting algorithm as disclosed herein, a control region, in which an operation point is located, can be determined in a computationally efficient manner. Hence, an operating state of the component can be identified by obviating multiple comparisons of measurement values against respective threshold values.

In some embodiments, the control envelope comprises one or more deadband regions to improve operation efficiency. In one aspect, a deadband region is a control region, in which an operating state associated with another control region prior to transitioning to the deadband region is maintained. In one example, in response to the operating point changing from a control region corresponding to an operating state to the deadband region, the operating state detector 460 maintains the operating state. Accordingly, an operating efficiency can be improved by avoiding constant cycling or a high frequency switching between different operating states.

Building and HVAC System

Figure 2:
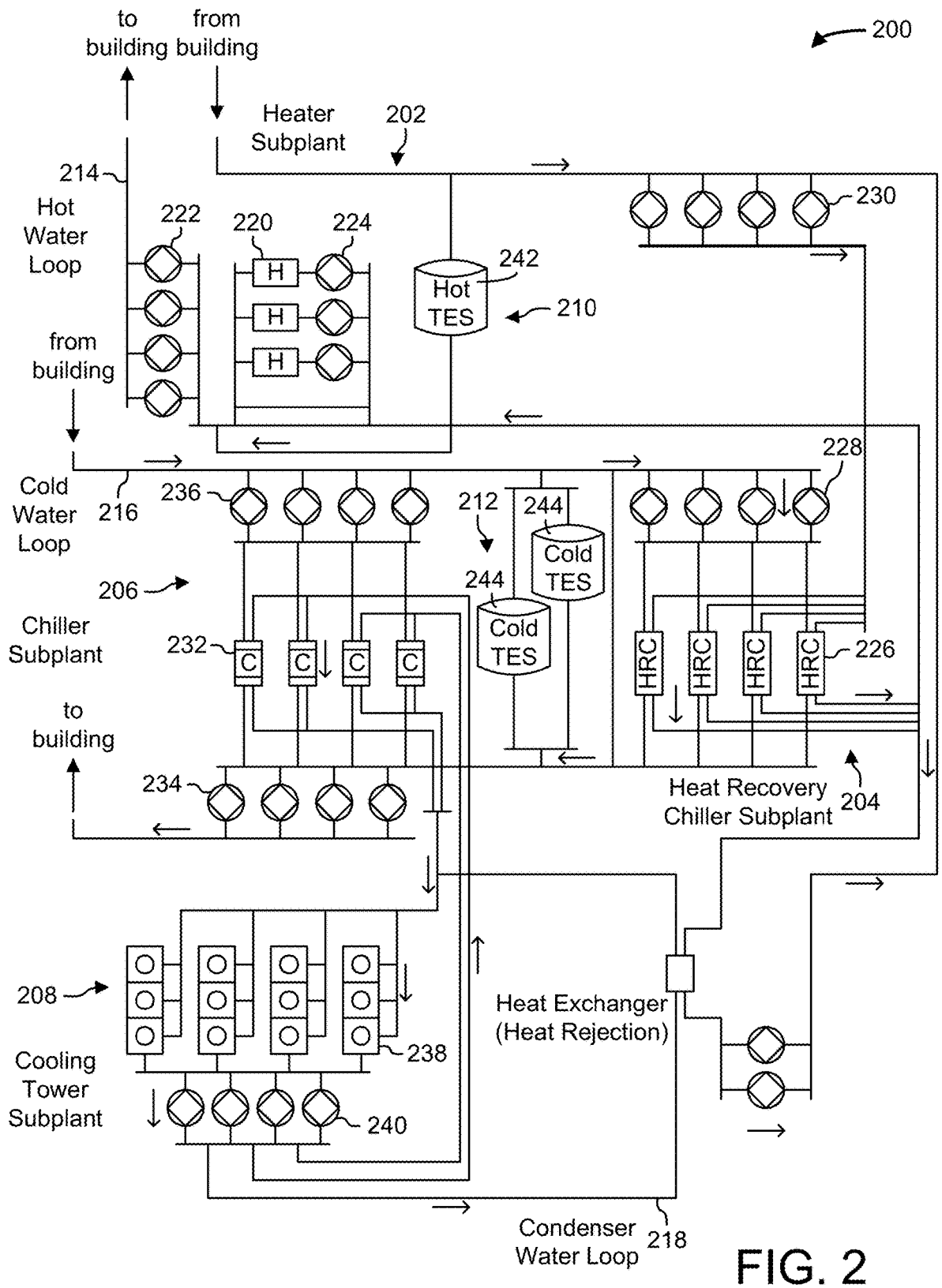
FIG. 2 is a schematic of a waterside system, which can be used as part of the HVAC system of FIG. 1, according to some embodiments.
Figure 3:
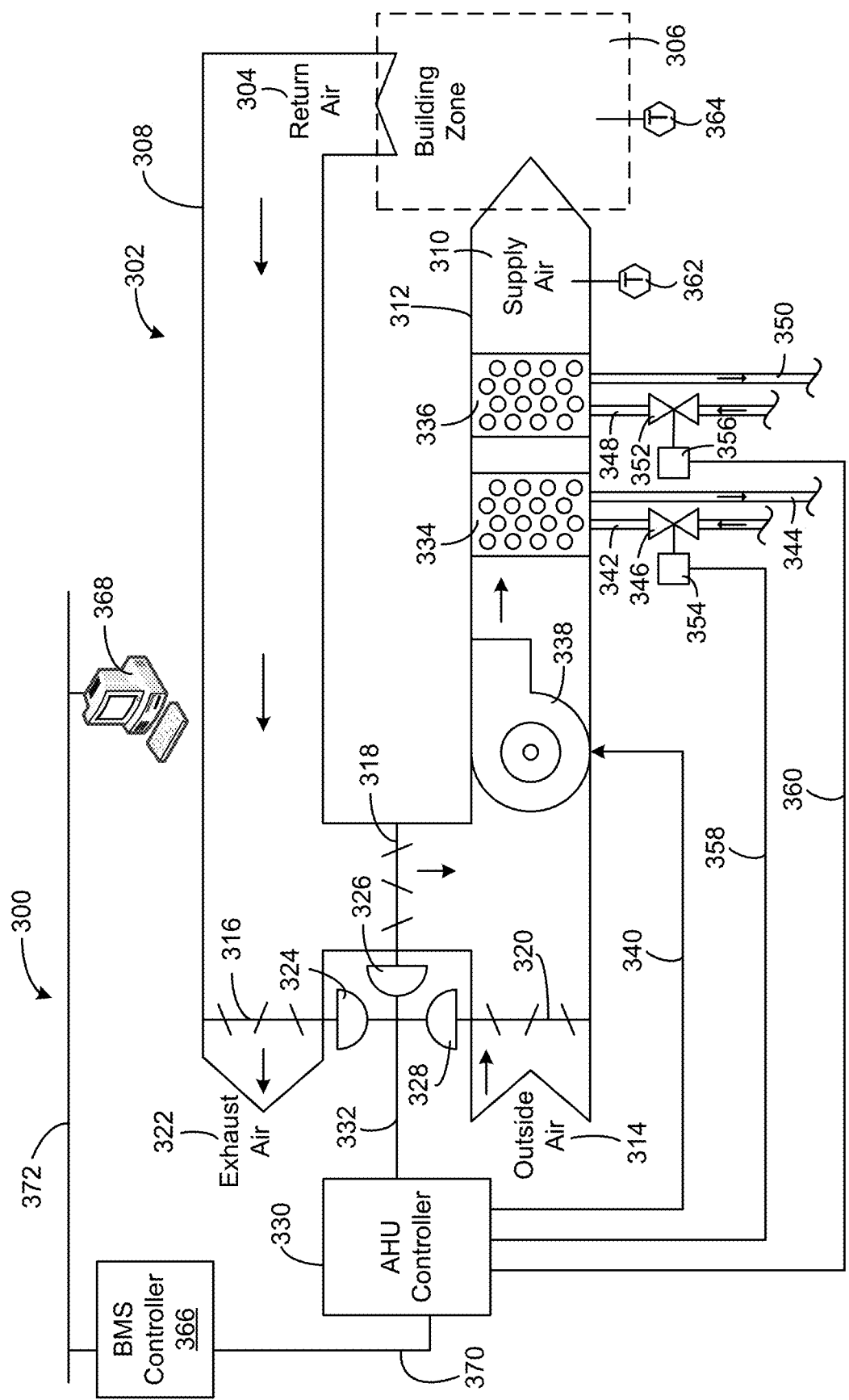
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Central Plant Controller

Figure 4:
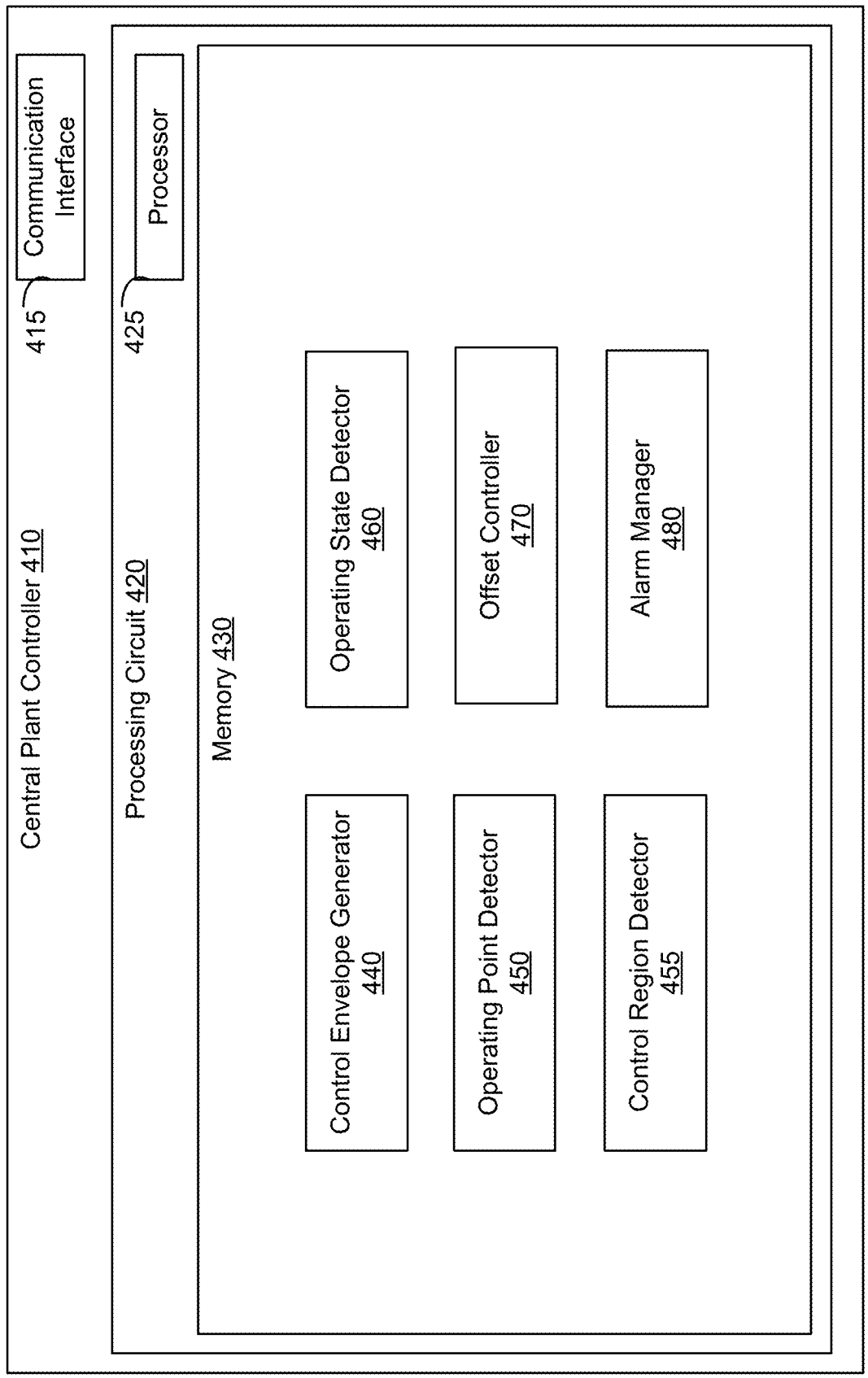
FIG. 4 is a block diagram of an example central plant controller controlling HVAC devices based on a control envelope, according to some embodiments.

Referring to FIG. 4, illustrated is a block diagram of an example central plant controller 410 of the HVAC system 100, according to some embodiments. In some embodiments, the central plant controller 410 includes a communication interface circuit 415 and a processing circuit 420. These components operate together to allow the central plant controller 410 to directly communicate with the HVAC devices and operate the HVAC devices accordingly. In some embodiments, the central plant controller 410 includes additional, fewer, or different components than shown in FIG. 4.

The communication interface circuit 415 facilitates communication of the central plant controller 410 with other HVAC devices (e.g., heaters, chillers, air handling units, pumps, fans, thermal energy storage, etc.). The communication interface circuit 415 can be or include wired or wireless communications interfaces (e.g., jacks, antennas, transmitters, receivers, transceivers, wire terminals, etc.). In various embodiments, communications via the communication interface circuit 415 can be direct (e.g., local wired or wireless communications) or via a communications network (e.g., a WAN, the Internet, a cellular network, etc.). For example, the communication interface circuit 415 can include an Ethernet/USB/RS232/RS485 card and port for sending and receiving data through a network. In another example, the communication interface circuit 415 can include a Wi-Fi transceiver for communicating via a wireless communications network. In another example, the communication interface circuit 415 can include cellular or mobile phone communication transceivers.

The processing circuit 420 is a hardware circuit executing instructions to directly communicate with HVAC devices and operate the HVAC devices accordingly. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a control envelope generator 440, an operating point detector 450, a control region detector 455, an operating state detector 460, an offset controller 470, and an alarm manager 480. In other embodiments, some functionalities performed by the processing circuit 420 may be implemented by a reconfigurable circuit (e.g., field programmable gate array (FPGA)), an application specific integrated circuit (ASIC), or any circuitries, or a combination of software modules and hardware modules.

The control envelope generator 440 can be configured to generate control envelopes for controlling HVAC devices. A control envelope of a component (e.g., HVAC device) includes boundaries of a plurality of available control regions in a multi-dimensional space defining one or more operating states of the component. In one aspect, an operating state of the component is indicated by a control region, in which an operating point is located. An operating point of a component is a set of values (e.g., inlet temperature, an outlet temperature, an inlet pressure, outlet pressure, etc.) indicating operating conditions of the component. In one example, an operating point located in a target control region corresponds to a target operating state. For another example, an operating point in a first control region adjacent to a first edge of the target control region corresponds to a first operating state, in which the component is to operate at a higher capacity (e.g., higher speed) than in the target operating state such that the operating point can transition to the target control region. Similarly, an operating point in a second control region adjacent to a second edge of the target control region corresponds to a second operating state, in which the component is to operate at a lower capacity (e.g., lower speed) than in the target operating state such that the operating point can transition to the target control region. In some embodiments, a control region may overlap with one or more other control regions.

In some embodiments, the control envelope generator 440 generates and stores, for each HVAC device, a corresponding control envelope. In one approach, the control envelope generator 440 receives a user input defining a boundary of a control region for a component, and generates the control envelope according to the user input. For example, the user input specifies vertices of a polygon or a polyhedron for a component, and the control envelope generator 440 generates the control envelope of the component according to the user specified vertices. In another approach, the control envelope generator 440 automatically generates a control envelope for a component according to characteristics of the component. For example, the control envelope generator 440 obtains values of operating parameters of different available operating states of the component, and automatically generates boundaries of control regions of the operating states. In some embodiments, the control envelope generator 440 generates and stores a control envelope before the deployment. In some embodiments, the control envelope generator 440 modifies the control envelope during a runtime according to a user input, according to detecting a change in a characteristic of the component, or both.

The operating point detector 450 is a software module that obtains an operating point in a vector format. In one approach, the operating point detector 450 obtains sensed values of operating parameters through sensors (e.g., sensors 362-364), through a manual user input, or a combination of them. The operating point detector 450 aggregates the obtained values, and determines the operating point indicating the obtained values in a vector format. In one aspect, the operating point represented in the vector format indicates a location in a multi-dimensional space. For example, an operating point of a compressor is represented as {Saturated Suction Temperature, Saturated Discharge Temperature}, where Saturated Suction Temperature indicates a location along an X-axis and Saturated Discharge Temperature indicates a location along a Y-axis. Hence, an operating state of a component can be easily determined based on a determination of a control region enclosing the operating point.

The control region detector 455 can be configured to determine a control region associated with an operating point. In one aspect, the control region detector 455 obtains an operating point from the operating point detector 450, and determines a control region, in which the operating point is located in a multi-dimensional space. In one approach, the control region detector 455 determines a control region through a ray casting algorithm. The control region detector 455 may detect a number of times a ray traversing or crossing a boundary of a control region, and determine whether the operating point is within the control region. A ray for a particular operating point may be a line that connects the current operating point to a point outside the control envelope (e.g., the origin point of the multi-dimensional space) or a previous operating point of the device. If the ray extends from the previous operating point to the current operating point, the ray may be a trajectory of a change of operating point of the device. In one approach, the control region detector 455 obtains information of a prior control region, in which a prior operating point was located. A prior control region may be known, pre-computed, or predetermined. For example, if a ray starting from inside a control region crosses or traverses the boundary of the control region an even number of times, then the control region detector 455 determines that the operating point is still located inside the control region. For another example, if the ray starting from inside the control region crosses or traverses the boundary of the control region an odd number of times, then the control region detector 455 determines that the operating point is located outside the control region. For another example, if the ray starting from outside a control region crosses or traverses the boundary of the control region an even number of times, then the control region detector 455 determines that the operating point is located outside the control region. For another example, if the ray starting from outside the control region crosses or traverses the boundary of the control region an odd number of times, then the control region detector 455 determines that the operating point is located inside the control region.

In some embodiments, the control region detector 455 determines whether an operating point has traversed or crossed a boundary of a control region based on vector cross product. In one approach, the control region detector 455 obtains an edge between two vertices, and a line segment of a ray between an operating point and a prior operating point. The control region detector 455 obtains a vector cross product of the edge and the line segment of the ray. If the edge and the line segment cross each other, the vector cross product becomes a point, at which the edge and the line segment cross. If the edge and the line segment do not cross, then the vector cross product becomes a predetermined value (e.g., '−1'). Thus, the control region detector 455 may determine whether the operating point has crossed a edge of the boundary based on a vector cross product by determining whether the vector cross product is the predetermined value or not. For example, the control region detector 455 obtains a edge of a control region between vertices {30° F., 139° F.} and {30° F., 68° F.}, and a line segment of a ray changing from {0° F., 0° F.} to {32° F., 135° F.}. In this example, the edge and the line segment cross, and the vector cross product of the edge and the line segment becomes {30° F., 126.6525° F.}. The control region detector 455 may determine whether the operating point has traversed or crossed other edges of the control region based on the vector cross products in a similar manner.

The operating state detector 460 is a software module that obtains from the operating point detector 450 the control region of a component, in which the operating point is located, and determines an operating state of the component according to the control region. The operating state detector 460 may store a look up table indicating a plurality of available control regions and corresponding operating states. The operating state detector 460 may identify an operating state for a control region, in which the operating point is located, through the look up table. Examples of available control regions and associated operating states are provided below with respect to FIGS. 5A and 5B.

In some embodiments, available control regions include one or more deadband regions. In one aspect, a deadband region is a control region, in which an operating state associated with another control region prior to transitioning to the deadband region is maintained. A deadband region may be located between two or more control regions or located within a control region. In one example, in response to the operating point changing from a control region corresponding to an operating state to the deadband region, the operating state detector 460 maintains the operating state. The operating state may be maintained until the operating point changes to another control region. By determining the operating state in consideration of one or more deadband regions, constant cycling or a high frequency switching between different operating states can be avoided.

The offset controller 470 is a software module that generates an offset value according to an operating state of a component determined by the operating state detector 460. An offset value may be a value for modifying an operation of a component. In one aspect, an offset value is modified according to a corresponding operating state of a component. In one example, an offset value of a speed-up state of a compressor applied to the compressor causes the compressor to operate, for example, at 10% higher speed than a speed of the compressor operating at the target operating state. In another example, an offset value of a slow-down state of the compressor applied to the compressor causes the compressor to operate, for example, at 10% lower speed than the speed of the compressor operating at the target operating state. An offset value may be predetermined or dynamically adjusted by a user.

The alarm manager 480 is a software module that generates an alarm counter according to operating states determined by the operating state detector 460. An alarm counter is a counter indicating a number of occurrences of the operating state of the component being a shut-down state. A shut-down state is a state of the component to be shut-down for a shut-down time period (e.g., 10 minute). The shut-down time period may be predetermined or dynamically adjusted. In one approach, if the operating state is the shut-down state, the alarm manager 480 increments the alarm count, for example, by a predetermined number (e.g., one). If the alarm count exceeds a predetermined threshold (e.g., three) within a predetermined time period (e.g., two hours), the alarm manager 480 may lockout the component. A locked-out component is disabled from operation, until the device is unlocked by a user. In some embodiments, in response to locking out the component, the alarm manager 480 generates a user interface that allows a user to unlock the component.

Figure 5A:
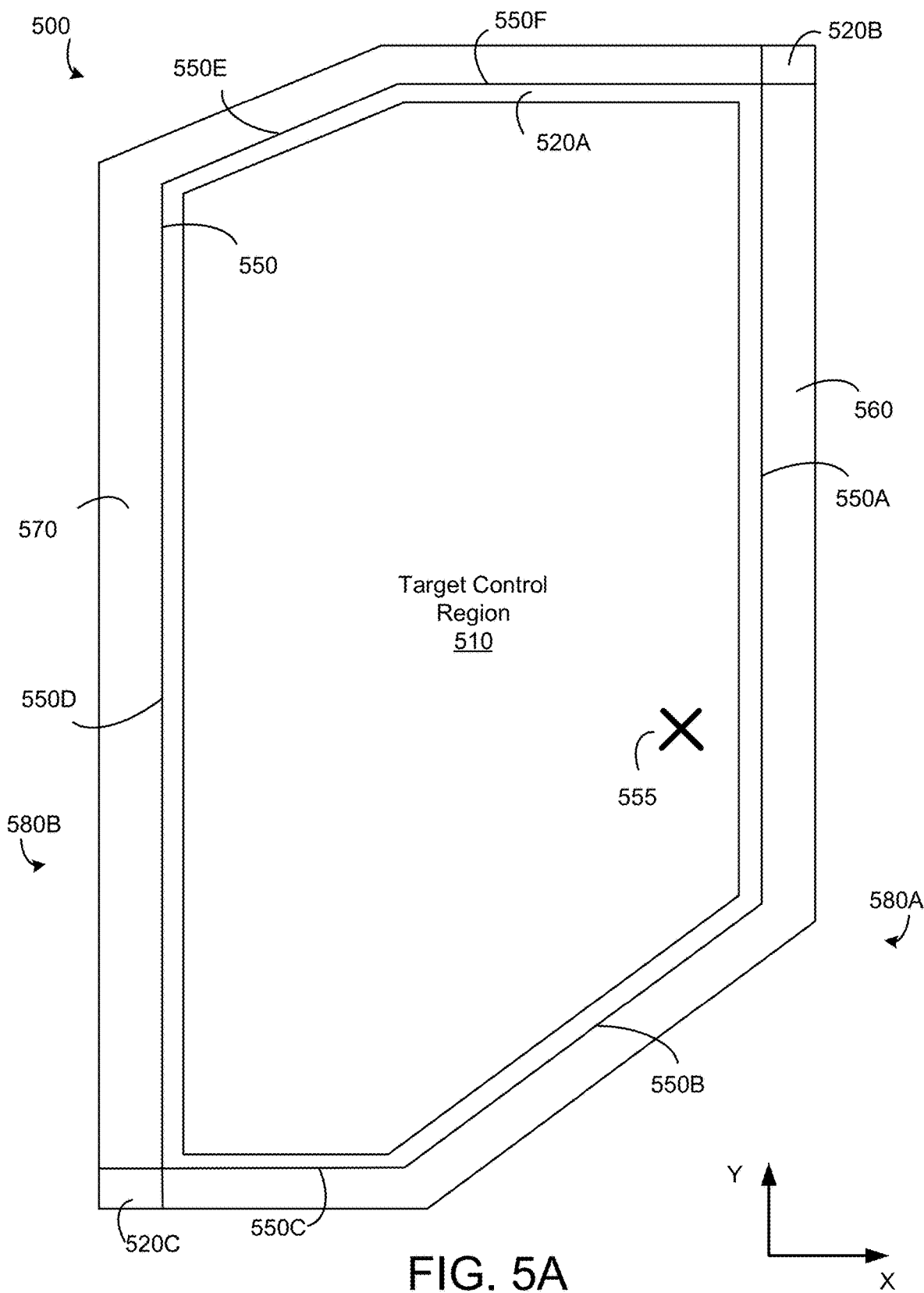
FIG. 5A is an example of a control envelope of a HVAC device with an operating point in a target control region, according to some embodiments.

Referring to FIG. 5A, illustrated is an example of a control envelope 500 of a HVAC device, according to some embodiments. In some embodiments, the central plant controller 410 operates the HVAC device according to a control region corresponding to a location of an operating point of the HVAC device in a two-dimensional space. In one example, the HVAC device is a compressor, and the control envelope 500 of the compressor includes boundaries defining control regions. Examples of the control regions include a target control region 510, deadband regions 520A, 520B, 520C (also referred to as "a deadband region 520" herein), a speed-up region 560, a slow-down region 570, and shut-down regions 580A, 580B (also referred to as "as shut-down region 580"). For the compressor, the operating point may be represented in X-axis and Y-axis, such as Saturated Suction Temperature, Saturated Discharge Temperature, respectively. In other embodiments, the control regions include more, fewer or different regions than shown in FIG. 5A. In other embodiments, the control regions are defined in a higher-dimensional space using more than two dimensions to define the various control regions and operating points. Other HVAC devices or any device may have similar control envelope control regions as shown in FIG. 5A.

In one example, the boundary 550 of the target control region 510 includes edges 550A, 550B, 550C, 550D, 550E, 550F defining a boundary of a polygon. In one example, the boundary 550 encloses a target control region 510 that corresponds to a target operating state of the compressor. In the target operating state, the device may operate within a target range of capacity (e.g., speed or power).

In one example, the speed-up region 560 is a region corresponding to a speed-up state of the compressor. In the speed-up state, the compressor is configured to operate at a higher speed (e.g., 10% higher) than the average speed or a maximum speed of the target operating state. By speeding up the compressor, the Saturated Suction Temperature, the Saturated Discharge Temperature, or both can be reduced such that the operating point may transition to the target control region 510.

In one example, the slow-down region 570 is a region corresponding to a slow-down state of the compressor. In the slow-down state, the compressor is configured to operate at a lower speed (e.g., 10% lower) than the average speed or a minimum speed of the target operating state. By slowing down the compressor, the Saturated Suction Temperature, the Saturated Discharge Temperature, or both can be increased such that the operating point may transition to the target control region 510.

In one example, the shut-down region 580A is located outside the speed-up regions 560 away from the boundary 550, and the shut-down region 580B is located outside the slow-down regions 570 away from the boundary 550. A shut-down region is a region corresponding to a shut-down state of the compressor. In the shut-down state, the compressor is shut-down for a shut-down time period (e.g., 10 minute). If the shut-down state occurs more than a threshold number during a predetermined time period (e.g., two hour), the compressor may be locked out. A locked-out component may be disabled from operation, until the device is unlocked by a user.

In one example, deadband regions 520A, 520B, 520C are provided to avoid frequent cycling or hysteretic behavior. In one example, the boundary 550 encloses deadband region 520A surrounding the target control region 510. The deadband region 520B is located adjacent to an edge of the speed-up region 560 and an edge of the slow-down region 570. The deadband region 520C is located adjacent to another edge of the speed-up region 560 and another edge of the slow-down region 570. In one example, in response to the operating point changing from a control region corresponding to an operating state to the deadband region, the operating state detector 460 maintains the operating state. For example, in response to a ray of operating point changing from the target control region 510 to the deadband region 520A, the target operating state is maintained. For another example, in response to a ray of operating point changing from a region (e.g., speed-up region 560 or slow-down region 570) outside the boundary 550 to the deadband region 520A, the operating state corresponding to the region (e.g., speed-up region 560 or slow-down region 570) is maintained. The operating state may be maintained, until the operating point of the device changes to another control region.

In one example, two or more control regions may overlap such that an operating point can be located within multiple control regions. For example, a point within the deadband region 520A overlaps with the target control region 510 within the boundary 550. When two or more control regions overlap, the HVAC device may operate according to an operating state associated with a region having a higher priority. For example, a deadband region 520A may have a higher priority than the target control region 510. If an operating point is located in the deadband region 520A, an operating state of the HVAC device may be determined according to a state of a prior or originating operating point according to the deadband region as described above.

Figure 5B:
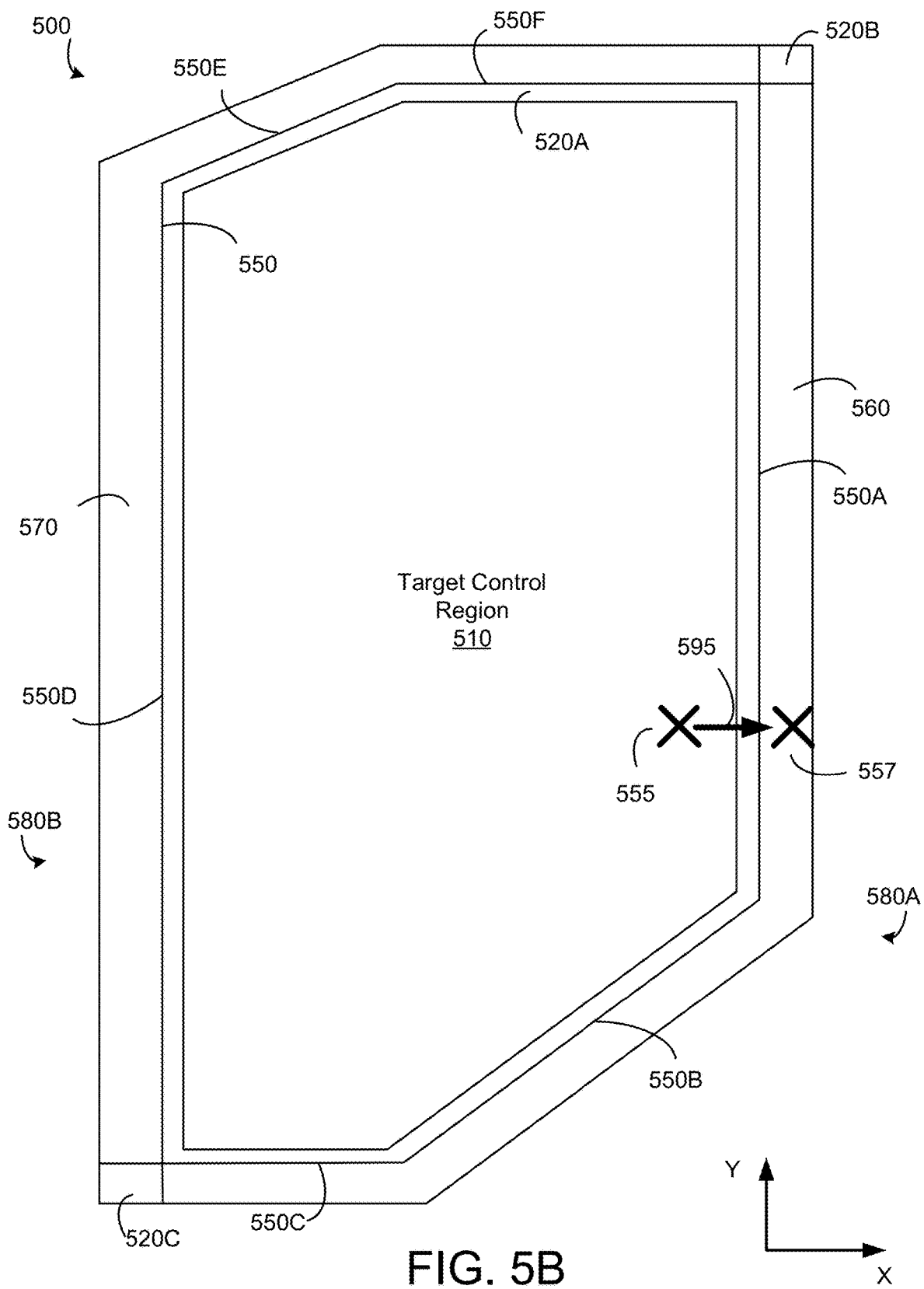
FIG. 5B is an example of a control envelope of a HVAC device with an operating point transitioned to outside the target control region, according to some embodiments.

Referring to FIG. 5B, a ray 595 of changing operating points 555, 557 is shown. In this example, the operating point 555 in the target control region 510 changes to the operating point 557 in the speed-up region 560. In one embodiment, the central plant controller 410 determines that the ray 595 from the target control region 510 crosses the boundary (or edge 550A) an odd number (e.g., once) of times, thus determines that the operating point has transitioned to the speed-up region 560.

Figure 5C:
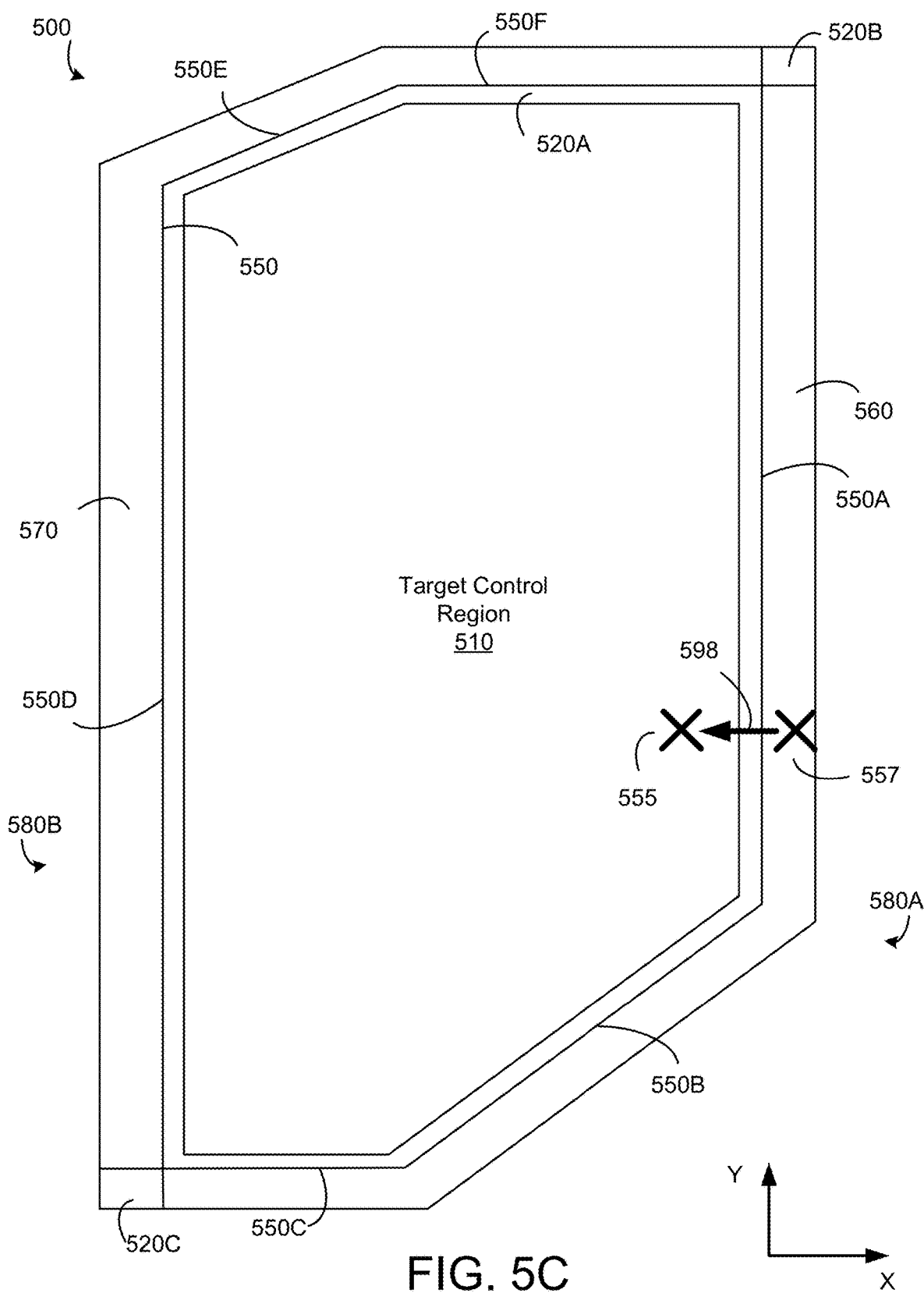
FIG. 5C is an example of a control envelope of a HVAC device with an operating point transitioned to inside the target control region, according to some embodiments.

Referring to FIG. 5C, a ray 598 of changing operating points 555, 557 is shown. In this example, the operating point 557 in the speed-up region 560 changes to the operating point 555 in the target control region 510. In one embodiment, the central plant controller 410 determines that the ray 598 from the speed-up region 560 crosses the boundary (or edge 550A) an odd number (e.g., once) of times, thus determines that the operating point has transitioned to the target control region 510. In one aspect, the central plant controller 410 determines whether the operating point is located inside a control region or not without exact information regarding previous operating point, but based on the number of crossings of the boundary 550 and whether the prior or originating operating point was inside or outside the control region.

Figure 6:
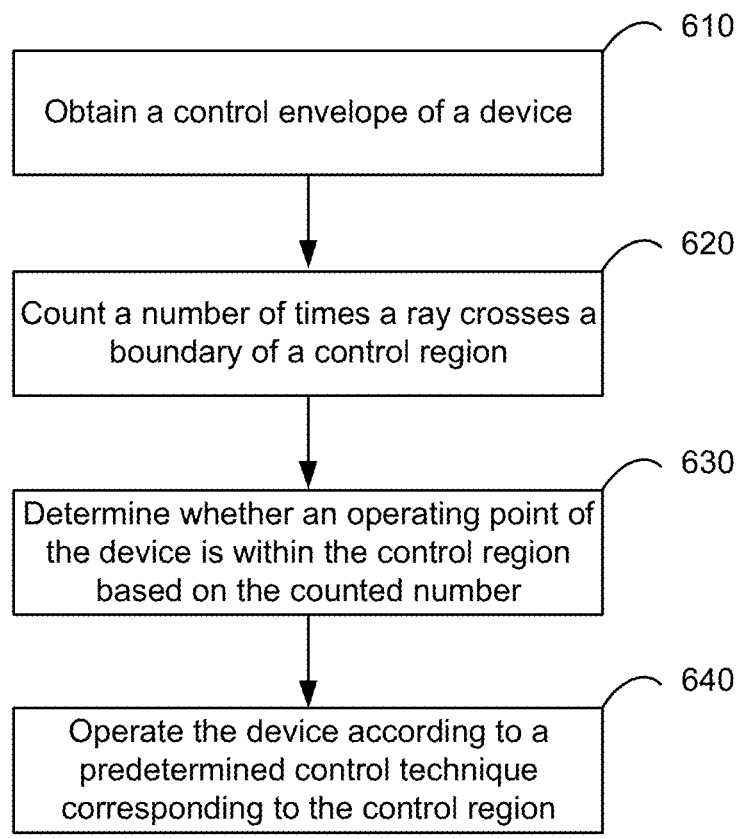
FIG. 6 is a flow chart illustrating an example process of controlling a central plant based on the control envelope, according to some embodiments.

Referring to FIG. 6, illustrated is a flow chart illustrating an example process of controlling a central plant based on the control envelope, according to some embodiments. The process 600 may be performed by the central plant controller 410 of FIG. 4. In some embodiments, the process 600 may be performed by other entities. In some embodiments, the process 600 may include additional, fewer, or different steps than shown in FIG. 6.

The central plant controller 410 obtains a control envelope (step 610). A control envelope includes boundaries of control regions in a multi-dimensional space defining operating states of a device (e.g., HVAC device) of the central plant. A boundary may define a plurality of control regions that may be discrete, partially overlap, or entirely overlap with each other. In one approach, the central plant controller 410 generates and stores, for each device, a corresponding control envelope. In one approach, the central plant controller 410 receives a user input (e.g., vertices of a polygon or a polyhedron) defining a control envelope for a device, and generates the control envelope of the device according to the user input. In another approach, the central plant controller 410 automatically generates a control envelope for a device according to predefined characteristics of the device indicating available control regions and associated values of operating parameters.

The central plant controller 410 counts a number of times a ray crosses a boundary of a control region (step 620). In one approach, the central plant controller 410 obtains sensed values of operating parameters through sensors, through a manual user input, or a combination of them. The central plant controller 410 aggregates the obtained values, and determines an operating point indicating the obtained values in a vector format. In one aspect, the operating point represented in the vector format indicates a location in a multi-dimensional space of operating parameters. The central plant controller 410 determines a ray of a device. A ray may be a trajectory of changing operating point of the device. In one approach, the central plant controller 410 determines whether a ray crosses a boundary of a control region based on a vector cross product, and counts the number of times the ray crosses the boundary of the control region. In one approach, the central plant controller 410 obtains an edge of the boundary between two vertices of the control region, and a line segment of a ray between an operating point and a prior operating point. The central plant controller 410 may obtain a vector cross product of the edge and the line segment of the ray. If the edge and the line segment cross each other, the vector cross product becomes a point, at which the edge and the line segment cross. If the edge and the line segment do not cross, then the vector cross product becomes a predetermined value (e.g., '−1'). Thus, the central plant controller 410 may determine whether the operating point has crossed an edge of the boundary based on a vector cross product by determining whether the vector cross product is the predetermined value or not. The central plant controller 410 may determine whether the operating point has traversed or crossed other edges of the control region based on the vector cross products in a similar manner.

The central plant controller 410 determines whether an operating point of the device is within the control region based on the counted number (step 630). For example, if a ray starting from inside a control region crosses or traverses the boundary of the control region an even number of times, then the central plant controller 410 determines that the operating point is still located inside the control region. For another example, if the ray starting from inside the control region crosses or traverses the boundary of the control region an odd number of times, then the central plant controller 410 determines that the operating point is located outside the control region. For another example, if the ray starting from outside a control region crosses or traverses the boundary of the control region an even number of times, then the central plant controller 410 determines that the operating point is located outside the control region. For another example, if the ray starting from outside the control region crosses or traverses the boundary of the control region an odd number of times, then the central plant controller 410 determines that the operating point is located inside the control region. In some embodiments, the steps 620, 630 can be performed for two or more control regions defined by the control envelope.

The central plant controller 410 operates the device according to a predetermined control technique corresponding to the determined control region or control regions in which the operating point is located (step 640). In one approach, a predetermined control technique is associated with a corresponding operate state. Examples of operating states of the device include a target operating state, a slow-down state, a speed-up state, a shut-down state, etc. The central plant controller 410 may refer to a look up table to determine an operating state associated with the control region. In one approach, the central plant controller 410 modifies an offset value according to the determined operating state, and operates the device according to the offset value. An offset value is a value applied to adjust an operating condition (e.g., speed) of the central plant controller 410. For example, in response to the operating state being the target operating state, the central plant controller 410 modifies the offset value to be ineffective (e.g., 0%) such that the device operates at a speed irrespective of the offset value. For another example, in response to the operating state being the speed-up state, the central plant controller 410 modifies the offset value to be a first value (e.g., +10%), such that the device may operate at a speed higher than the speed corresponding to the target operating state by the first value. For another example, in response to the operating state being the slow-down state, the central plant controller 410 modifies the offset value to be a second value (e.g., −10%), such that the device may operate at a speed lower than the speed corresponding to the target operating state by the second value.

In one approach, the central plant controller 410 determines an operating state in consideration of one or more deadband regions. In one aspect, a deadband region is a control region, in which an operating state associated with another control region prior to transitioning to the deadband region is maintained. In one example, in response to the operating point changing from a control region corresponding to an operating state to the deadband region, the central plant controller 410 maintains the operating state. By determining the operating state in consideration of one or more deadband regions, constant cycling or a high frequency switching between different operating states can be avoided.

Figure 7:
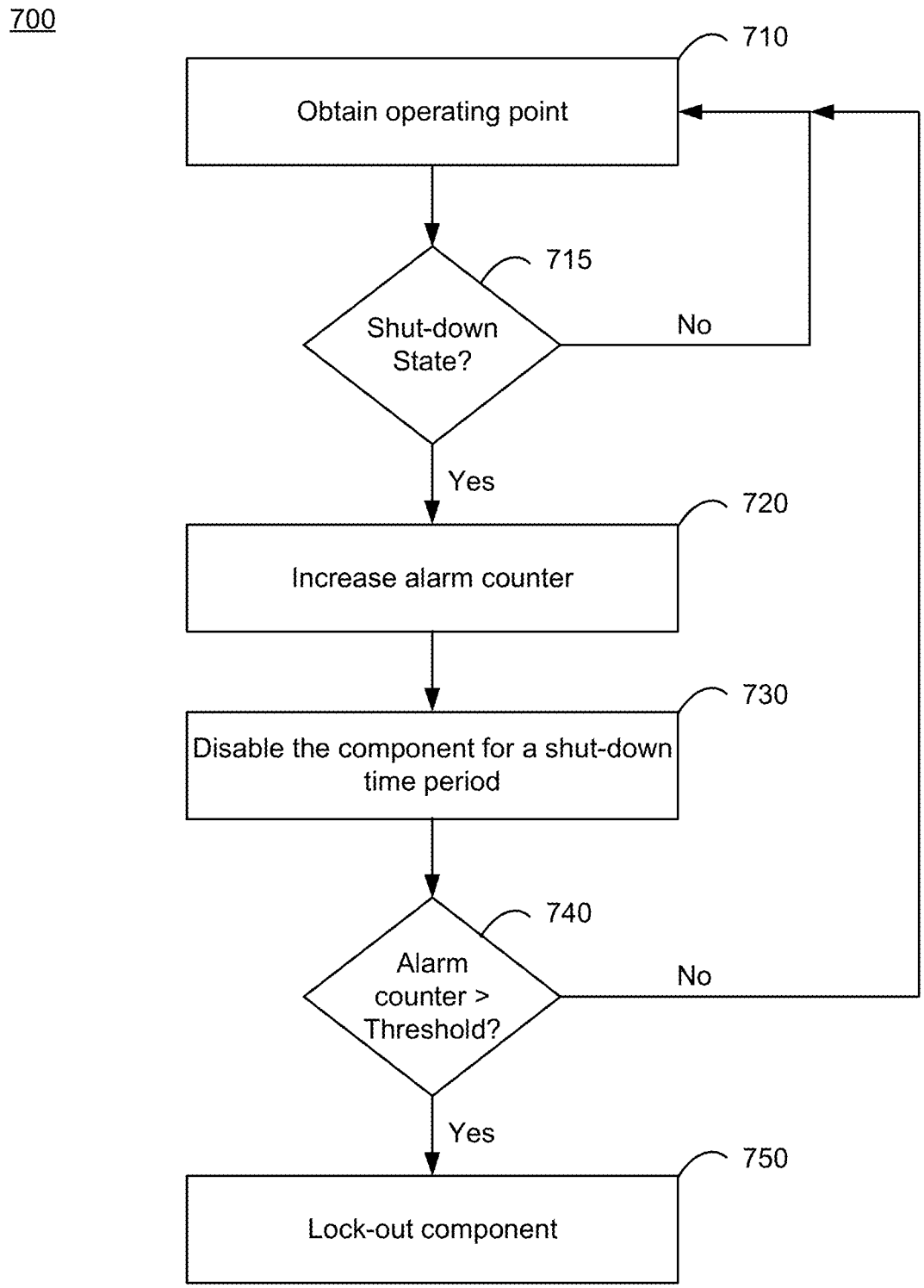
FIG. 7 is a flow chart illustrating an example process of controlling a HVAC device based on an alarm counter, according to some embodiments.

Referring to FIG. 7, illustrated is an example process of controlling a device (e.g., HVAC device) based on an alarm counter, according to some embodiments. The process 700 may be performed by the central plant controller 410 of FIG. 4. In some embodiments, the process 700 may be performed by other entities. In some embodiments, the process 700 may include additional, fewer, or different steps than shown in FIG. 7. In some embodiments, the central plant controller 410 initiates the process 700 after a set up time period (e.g., five minutes) from starting operation of the device.

The central plant controller 410 obtains operating point of the device (step 710), and determines an operating state of the device according to a control envelope as described above with respect to FIGS. 4 through 6. The central plant controller 410 determines whether the operating state of the device is the shut-down state (step 715). For example, if a ray starting from a control region outside of the shut-down region crosses the boundary of the shut-down region an odd number of times, then the central plant controller 410 determines that the operating point is within the shut-down region, hence the operating state of the device is a shut-down state. In response to determining that the operating state is not the shut-down state, the central plant controller 410 returns to the step 710.

In response to determining that the operating state is the shut-down state, the central plant controller 410 increases an alarm counter (step 720), and disables the device for a shut-down time period (e.g., 10 minute) (step 730). In one approach, the central plant controller 410 increases the alarm counter, each time the operating point has entered or is located in a control region corresponding to the shut-down state. After the shut-down time period, the device may be enabled and become operational.

The central plant controller 410 determines whether the alarm counter exceeds a predetermined threshold (step 740). In response to the alarm counter not exceeding the threshold, the central plant controller 410 may return to the step 710 and obtain an additional operating point. In response to the alarm counter exceeding the predetermined threshold, the central plant controller 410 locks out the device (step 750). The locked-out device is disabled until it is unlocked by a user operating the device. In response to locking out the device, the central plant controller 410 may generate a user interface allowing the user to manually unlock the device. When the device is unlocked, the alarm counter may be reset. In some embodiments, the central plant controller 410 reduces or resets the alarm counter, in response to the alarm counter not exceeding the threshold within a predetermined time period (e.g., two hour). Hence, a device that frequently operates in the shut-down state can be locked out, where a device that infrequently operates in the shut-down state can be excluded from being locked out.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller, the controller comprising:
   a processing circuit comprising a processor and memory storing instructions executed by the processor, the processing circuit configured to:
      obtain a control envelope for a device controlled by the controller, the control envelope comprising boundaries of a plurality of control regions in a multidimensional operating space for the device, each control region enclosed by a corresponding boundary;
      count a number of times that a ray crosses the boundary of a control region;
      determine whether an operating point of the device is within the control region based on the counted number; and
      operate the device according to a predetermined control technique corresponding to the control region, in response to determining that the operating point of the device is within the control region.

2. The controller of claim 1, wherein the processing circuit is further configured to:
   determine that the operating point of the device is within the control region, in response to the counted number being an even number.

3. The controller of claim 1, wherein the processing circuit is further configured to:
   determine that the operating point is within another control region, in response to the counted number being an odd number.

4. The controller of claim 1, wherein two or more control regions overlap with each other.

5. The controller of claim 1,
   wherein the device is a compressor,
   wherein a first control region of the plurality of control regions is associated with a target operating state of the device, the device to operate at a speed within a predetermined range in the target operating state,
   wherein a second control region of the plurality of control regions is associated with a speed-up state of the device, the device to operate at a speed above the predetermined range in the speed-up state, and
   wherein a third control region of the plurality of control regions is associated with a slow-down state of the device, the device to operate at a speed below the predetermined range in the slow-down state.

6. The controller of claim 1, wherein the multidimensional operating space of the device includes a saturated discharge temperature and a saturated suction temperature of the device.

7. The controller of claim 1, wherein the processing circuit is further configured to:
   increase an alarm counter in response to determining that the operating point is within the control region associated with a shut-down state, the device to be disabled in the shut-down state for a shut-down time period.

8. The controller of claim 7, wherein the processing circuit is further configured to:
   lockout the device in response to the alarm counter exceeding a predetermined threshold; and
   generate a user interface allowing a user operating the controller to unlock the device.

9. The controller of claim 8, wherein the processing circuit is further configured to:
   reset the alarm counter in response to the alarm counter not exceeding the predetermined threshold within a predetermined time period.

10. The controller of claim 1, wherein the processing circuit is configured to:
    detect a change of the operating point of the device to a deadband region; and
    operate the device according to the predetermined control technique corresponding to the control region, until the operating point of the device changes to another control region.

11. A method of operating a device, the method comprising:
    obtaining a control envelope for the device, the control envelope comprising boundaries of a plurality of control regions in a multidimensional operating space for the device, each control region enclosed by a corresponding boundary;
    counting a number of times that a ray crosses the boundary of a control region;
    determining whether an operating point of the device is within the control region based on the counted number; and
    operating the device according to a predetermined control technique corresponding to the control region, in response to determining that the operating point of the device is within the control region.

12. The method of claim 11, further comprising:
determining that the operating point of the device is within the control region, in response to the counted number being an even number.

13. The method of claim 11, further comprising:
determining that the operating point is within another control region, in response to the counted number being an odd number.

14. The method of claim 11, wherein two or more control regions overlap with each other.

15. The method of claim 11,
wherein the device is a compressor,
wherein a first control region of the plurality of control regions is associated with a target operating state of the device, the device to operate at a speed within a predetermined range in the target operating state,
wherein a second control region of the plurality of control regions is associated with a speed-up state of the device, the device to operate at a speed above the predetermined range in the speed-up state, and
wherein a third control region of the plurality of control regions is associated with a slow-down state of the device, the device to operate at a speed below the predetermined range in the slow-down state.

16. The method of claim 11, further comprising:
increasing an alarm counter in response to determining that the operating point is within the control region associated with a shut-down state, the device to be disabled in the shut-down state for a shut-down time period.

17. The method of claim 16, further comprising:
locking out the device in response to the alarm counter exceeding a predetermined threshold; and
generating a user interface allowing a user operating the device to unlock the device.

18. The method of claim 17, further comprising:
resetting the alarm counter in response to the alarm counter not exceeding the predetermined threshold within a predetermined time period.

19. The method of claim 11, further comprising:
detecting a change of the operating point of the device to a deadband region; and
operating the device according to the predetermined control technique corresponding to the control region, until the operating point of the device changes to another control region.

20. A controller for an energy plant, the controller comprising:
a processing circuit comprising a processor and memory storing instructions executed by the processor, the processing circuit configured to:
obtain a control envelope for a heating, ventilation and air conditioning (HVAC) device controlled by the controller, the control envelope comprising boundaries of a plurality of control regions in a multidimensional operating space for the HVAC device, each control region enclosed by a corresponding boundary;
count a number of times that a ray of the HVAC device crosses the boundary of a control region;
determine whether an operating point of the HVAC device is within the control region based on the counted number; and
operate the HVAC device according to a predetermined control technique corresponding to the control region, in response to determining that the operating point of the HVAC device is within the control region.

* * * * *